United States Patent
Munholland

(10) Patent No.: US 9,932,170 B2
(45) Date of Patent: Apr. 3, 2018

(54) CARGO CAROUSEL SYSTEM FOR SHIPPING CONTAINERS AND METHOD FOR USING SAME

(71) Applicant: Glen Munholland, Calgary (CA)

(72) Inventor: Glen Munholland, Calgary (CA)

( * ) Notice: Subject to any disclaimer, the term of this patent is extended or adjusted under 35 U.S.C. 154(b) by 0 days.

(21) Appl. No.: 15/305,415

(22) PCT Filed: Apr. 9, 2015

(86) PCT No.: PCT/CA2015/000237
§ 371 (c)(1),
(2) Date: Oct. 20, 2016

(87) PCT Pub. No.: WO2015/161355
PCT Pub. Date: Oct. 29, 2015

(65) Prior Publication Data
US 2017/0043947 A1 Feb. 16, 2017

Related U.S. Application Data

(60) Provisional application No. 61/984,391, filed on Apr. 25, 2014.

(51) Int. Cl.
*B65G 1/133* (2006.01)
*B65G 17/20* (2006.01)
(Continued)

(52) U.S. Cl.
CPC ....... *B65D 90/0073* (2013.01); *B65D 90/004* (2013.01); *B65G 1/133* (2013.01);
(Continued)

(58) Field of Classification Search
CPC ........ B65G 1/133; B65G 1/127; B65G 17/20; B65G 17/485; B65G 65/00; B65D 90/004; B65D 90/0073; B65D 2590/0083
See application file for complete search history.

(56) References Cited

U.S. PATENT DOCUMENTS 1,753,914 A * 4/1930 Bodge ..................... A21B 1/46
198/797
5,447,407 A * 9/1995 Weaver ................. B65G 1/127
193/27

(Continued)

FOREIGN PATENT DOCUMENTS

DE          1089204       3/1959
DE     10 2015 204 35    9/2016
(Continued)

OTHER PUBLICATIONS

Wikipedia, "Space frame", Feb. 2013.*
(Continued)

*Primary Examiner* — Mark A Deuble
(74) *Attorney, Agent, or Firm* — MBM Intellectual Property Law LLP

(57) ABSTRACT

A cargo carousel system for shipping containers is provided that can include a frame configured to fit within a shipping container and a cargo carousel mechanism in the frame that can move cargo pod platforms, configured for holding cargo pods, in a continuous loop path in the frame. The system can further include two frames side-by-side in the shipping, each frame with its own cargo carousel system.

12 Claims, 11 Drawing Sheets

(51) Int. Cl.
   *B65G 65/00* (2006.01)
   *B65D 90/00* (2006.01)
   *B65G 17/48* (2006.01)

(52) U.S. Cl.
   CPC ........... *B65G 17/20* (2013.01); *B65G 17/485* (2013.01); *B65G 65/00* (2013.01); *B65D 2590/0083* (2013.01)

(56) References Cited

U.S. PATENT DOCUMENTS

| | | | | |
|---|---|---|---|---|
| 5,636,722 | A * | 6/1997 | Koop | A23G 7/00 198/347.1 |
| 5,863,172 | A * | 1/1999 | Pearson | B65G 1/133 198/801 |
| 5,899,657 | A * | 5/1999 | Hodges | E04H 6/14 414/233 |
| 6,814,214 | B2 * | 11/2004 | Warlow | B65D 19/08 198/300 |
| 2004/0089518 | A1 * | 5/2004 | Irish | B65G 1/127 198/678.1 |
| 2005/0279613 | A1 * | 12/2005 | Ufland | B65G 17/20 198/465.4 |
| 2008/0298943 | A1 * | 12/2008 | Siegel | B65G 1/127 414/567 |

FOREIGN PATENT DOCUMENTS

| | | | | |
|---|---|---|---|---|
| JP | 58063609 A | * | 4/1983 | ............ B65G 1/127 |
| JP | 07 125813 | | 5/1995 | |
| WO | WO 9309045 A1 | * | 5/1993 | ............ B65G 1/127 |

OTHER PUBLICATIONS

PCT/CA2015/00237 Search Report dated Jul. 23, 2015.
PCT/CA2015/00237 Written Opinion dated Jul. 25, 2015.
EPO Communication dated Dec. 14, 2017.

* cited by examiner

CARGO CAROUSEL SYSTEM FOR SHIPPING CONTAINERS AND METHOD FOR USING SAME

CROSS-REFERENCE TO RELATED APPLICATIONS

This application claims priority to International Application No. PCT/CA2015/00237 of the same title filed Apr. 9, 2015, which claims priority of U.S. provisional patent application No. 61/984,391 filed 25 Apr. 2014, which is incorporated by reference into this application in its entirety.

TECHNICAL FIELD

The present disclosure is related to the field of logistics, in particular, cargo carousel systems for use with shipping containers, and methods of using the same.

BACKGROUND

Intermodal shipping containers are used to ship goods all over the world, wherein the containers can be transported by ship, rail, truck or any combination thereof. While standardized, they can come in a variety of lengths, widths, heights and configurations to accommodate various types of goods. Shipping containers can also include detachable trailer containers used in tractor-trailer units and cargo boxes attached to truck frames, such as on "cube vans" and "moving vans".

In the practical use of such containers, they are often underutilized when loaded with cargo or packaged goods. In addition, packaged goods stacked within the containers can shift within the container causing damage to the goods contained therein. Boxed goods can also be crushed by other goods stacked above them, again causing damage to the goods contained therein.

The procurement and fulfillment networks of global trading companies are becoming increasingly complex. Today it's not just multinational corporations who manage global supply chains—there are hardly any medium-sized businesses left, which don't have customers or suppliers in Asia, the U.S. and/or Latin America. Additional challenges arise through continuously increasing numbers of supply chain partners, complex distribution channels and diverse product portfolios, as well as higher market standards and customer expectations regarding on-time deliveries and quality of service.

Based on this complexity, online tracking now needs to go far beyond the "track and trace" of a decade ago. It is no longer about simply tracking a shipment from the point of pick-up to the point of delivery, but about achieving visibility throughout the entire supply chain, providing transparency of orders in demand, production, transit, customs clearance, stock, and overall order fulfillment, while monitoring all individual process steps and making the data available to all relevant supply chain partners.

As supply chain complexity increases, together with an accelerating pace of business, supply chain visibility becomes critical. Some companies boast of immediate access to any information they need within their four walls; but this is simply no longer a competitive capability. In the quest for faster go-to-market and time-to-customer, real-time, continuous access and visibility is necessary not only within the four walls but across the extended supply chain. This remains an elusive goal for many companies.

As risks in the supply chain continue to occur and customer demand continues to be less tolerant of disruptions, more companies are recognizing the importance of creating and managing a visible supply chain. Although different interpretations and definitions abound, one way to think of supply chain visibility is: the right information, in actionable detail, on events, orders, inventory, and shipments, up and down, and end to end, updated and presented in real time. This definition—ambitious by intention—sets the goal of having visibility through every tier of the supply base, with every supply chain partner, in real time. This means continuous real-time automated presentation of information about such things as a real-time consolidated view of inventories across the supply chain, real-time stock and materials in transit, event management with real-time alerting and a continuous projection of future inventory levels from demand, inventory, and fulfillment data.

It is, therefore, desirable to provide a system for storing and handling goods placed in shipping containers to better utilize the space contained therein and to prevent damage to goods being shipped in the shipping containers.

SUMMARY

A cargo handling, storage and organization system is provided for use in a shipping container, such as an intermodal shipping container or a truck trailer, as commonly used in shipping goods overseas, on rail and by truck. For the purposes of this application, the term "shipping container" shall mean any shipping container suitable for shipping goods by any means of transport and shall further include, without limitation, intermodal shipping containers, detachable trailer units for use in tractor-trailer units and cargo containers or boxes as affixed to truck frames as used in "cube vans" and "moving vans", as well known to those skilled in the art.

In some embodiments, broadly stated, a cargo handling, storage and organization system is provided for use in a shipping container, such as an intermodal shipping container or truck trailer, as commonly used in shipping good(s) overseas, on rail and by truck. It can also be stacked in a warehouse in place of racking for storage or backed up to the bay doors of retail stores.

The system can comprise a framework that can be assembled and then inserted into a container or trailer, or installed in-situ in the container or trailer. The system can comprise a conveyer installed in the upper half of the framework. The conveyor can comprise a roller at each end, connected by a drive means, such as a chain or the like, that can support cargo "pods" or "modules" from both the upper side and lower side of the conveyor such that the cargo modules are organized in two horizontal rows along the length of the container. In some versions, two conveyor systems can be placed side-by-side in the container.

In some embodiments, the system is an industry-changing, disruptive technology using two basic old workhorse technologies. Coupling the chain-driven mechanism of an electric garage door opener with the circular motion of a Ferris wheel that keeps each of its modules in a continuously upright position they combine to achieve a new product designed to increase the efficiency, flexibility, scalability and sustainability of the supply chain.

In some embodiments, the system can comprise a structural framework developed to fit inside an existing ISO container or truck trailer (hereinafter, considered one in the same). The framework can be built to fit the size of any container, trailer or truck box and newly manufactured containers can be custom designed and built to incorporate the framework's requirements within their current structural design.

What would not be apparent at the first glance of this system are the wireless capabilities within each of the system's modules. Utilizing the open-faced, cubic design of the modules can allow RFID readers to sense whatever is within the four foot cubic space of each individual module whether it is on a container, in transit, in a warehouse or in a retail store and, whether items have been loaded or unloaded anywhere or at any time, it will always know exactly what is within its four foot cubic space. With a password-protected cloud-based portal, the contents of each module can be traced anywhere in the world at any time to determine the detailed contents of each module at any given point in time. In some embodiments of computer software that can be used in the tracking of shipment of goods, selecting an icon displayed on a computer screen that represents a desired shipping container can produce a list of each module's contents on the display with details from standardized data synchronization initiatives like the ECCnet Registry of GS1 and the Global Data Synchronization Network ("GDSN") Network from the GS1/EPCglobal[1] Network, as well known to those skilled in the art.

[1] "EPC" stands for Electronic Price Codes

In some embodiments, a separate antenna for each module transmitting to the onboard Central Processing Unit ("CPU") the container's own external antenna can transmit a continuous, real-time duplex satellite feed for the portal 24/7/365 allowing almost limitless reporting potential depending on the size, power and sophistication of the CPU. To overcome the problems of poor satellite transmission penetration through buildings and containers, each module on the container can transmit to the onboard CPU within the container, which can then transmit to a DAS (Distributed Antenna system) or other in-house routing system when in an indoor transport, distribution or storage facility. From there, transmission can be unlimited. In some embodiments, the system can comprise an offline back-up battery with transformer capabilities to insure power is always available from either a tractor while in transit, or can further comprise means to receive power from an 120 AC volt outlet at a distribution center or retail store, or from the off-line back-up battery when left alone out in the yard.

In some embodiments, the system can comprise open architecture software and an integration engine for sharing content and data between businesses and their applications with full programme and web-based application programme interface ("API") in a secure cloud-based portal allowing any program to access, cross-reference and integrate this data with their enterprise resource planning ("ERP") or legacy systems while eliminating antiquated electronic data interchange ("EDI") methodologies. In some embodiments of use of the system, trading partner collaborations can be increased through the secure, seamless integration of the system but, more importantly, collaboration to re-design not only the processes and functionality of assets but of entire supply chains can increase efficiency and cut costs beyond any other efforts imaginable.

In some embodiments, individual modules can be designed as floor display fixtures for a retail setting, allowing the re-design to go all the way back to the manufacturing floor. Product can be packaged in the retail floor display fixture, and shipped directly to the retail store with all products tagged and ready for sale. Entire fixtures can then be swapped out as necessary. To further these lines of thinking, consider developing the individual modules as other carousels within the cargo carousel system. In some embodiments, individual items can line up to individual secure openings in the front or back of the container. A customer who orders and pre-pays online can simply go to the container location with the same pre-pay card or a reference number to enter and pick up their item or can have a courier do it for them for immediate delivery. This is an excellent delivery system for the ever-growing, global problems of urbanization. The same will hold true for robotic automation in the warehouse. In some embodiments, existing racking can be replaced a with a geostationary cargo carousel system and the exact location of any item can be identified with a simple global positioning system ("GPS") or real-time location system ("RTLS") built right into the onboard CPU with a very simple graphical user interface that any employee can utilize for cross-docking, pick and pack, etc. and it can all be initiated through telematics without even leaving their office.

In some embodiments, entire warehouses can be retrofitted (no need to build new) to handle the loading and unloading of entire containers, not just their contents. If properly planned, a cargo carousel system can replace racking in any location (production, distribution center, store, etc.) and be stacked in a stationary position two or three high with electrical plug-ins and a fully automated, satellite fed system that can be completely robotic, totally hands-free and functional 24/7. "Lights-out" warehousing is no longer a dream. New warehousing plans might be eliminated in favor of secure outdoor yards holding nothing but cargo carousel containers stacked as high as necessary. The same can be done in the parking lot of any retail store, replacing existing back-room storage with more retail space while utilizing multiple cargo carousel containers, either in the parking lot or backed up to bay doors.

The design of the individual modules is what will make each cargo carousel container unique in its own way, and there are countless ways to design the individual modules. They can all be the same or mixed in any combination desired. In some embodiments, a base-level design can comprise a three-sided design with hinged top and front added with GPS and satellite capabilities. Any other design or software additions can be developed upon request or as needed.

In some embodiments, the transition of implementing a cargo carousel container system from existing systems can be easy. The system can eliminate pallets, or can continue to use pallets while the transition is implemented even without the track & trace elements in place which can be added at any time. The same can hold true for production, transport, racking, warehouse, distribution center and retail space utilization. Unlike the Physical Internet envisioned by Dr. Benoit Montreuil[2] (incorporated by reference herein in its entirety) or other proposals, a cargo carousel container system does not require huge changes to existing infrastructure or large cash outlays over extended periods of time. It can be utilized immediately with only minor changes to planning and processes and then be more fully integrated over time without interruption to current operations.

[2] https://www.cirrelt.ca/DocumentsTravail/CIRRELT-2011-03.pdf

In some embodiments, a cargo carousel container system can add more immediate flexibility to the supply chain while also offering unequalled scalability over time. Need more space? Add another cargo carousel container. Even start-up businesses and ventures can have their own warehouse parked in their backyard. Seasonal volume changes can now be easily absorbed without the need for new warehousing that is underutilized during regular seasons.

In some embodiments, the cruise/shipping industry could utilize pre-ordered, pre-stocked refrigerated units of cargo carousel containers that can be exchanged for empty units when the ship comes into port. Naval or other marine fleets could replenish supplies in a much more efficient manner. Recycling and reverse logistics would be natural extensions of the system's capabilities. In some embodiments, modules that have just been delivered can be exchanged with a pick-up of store return or recyclable modules in the same visit without ever leaving the dock while eliminating the need for dock plates or levelers.

In some embodiments, a four cubic-foot module can become a world shipping standard, and intermodal containers can be designed to handle them with a cargo carousel system installed therein. The four foot cube is already used to a large degree in the supply chain. The row height of most racking is set at four feet and the uprights are 3.5 feet deep to accommodate the safety overhang of four foot deep pallets. The air freight industry already has standardized four foot cubes integrated into the storage capacity for much of the fleet. The four foot cube is stable, human workable, and fits where it needs to without much change to infrastructure. The billable charge per unit of transport would become dimension-based packaging utilizing the four-foot cube model and be combined with a Distributed Multi-Segment Intermodal Transport system for end-to-end efficiency gains.

In some embodiments, broadly stated, the technology components for a cargo carousel container system can comprise:
- connectivity: real-time, business-to-business network;
- data repository;
- supplier and/or other portals;
- alerting/event management capability;
- reporting/metrics;
- display/presentation: views, dashboards, often role based, updated in real time;
- business process customization;
- mobile capability;
- wireless technology;
- social capabilities;
- configurable analytics; and
- role-based security.

In 2014 and beyond, expect to see more supply chain vendors responding to end users' needs for more robust visibility capabilities in every aspect of their supply chains. While visibility deep into the supplier base has been a particular challenge, end users are increasingly looking for visibility across every stage of their supply chain, from better demand signals, and supplier audits to track-and-trace capabilities, to logistics tracking. Bringing a cargo carousel container system into the greater supply chain planning process offers tremendous strategic and performance potential. By leveraging the cargo carousel container system as a callable capability and incorporating it into downstream transportation and upstream supply chain workflows, companies can improve asset utilization, use fewer trucks, drive fewer miles, have fewer empty backhauls, reduce fuel costs, enhance distribution/retailing operations and increase recycling around the world by an order of magnitude.

Broadly stated, in some embodiments, a cargo carousel system is provided for use in shipping containers, wherein the system can comprise: a carousel frame configured to be disposed in a shipping container; at least one cargo carousel mechanism disposed within the carousel frame, the at least one cargo carousel mechanism configured to releasably receive a plurality of cargo pod platforms, the at least one cargo carousel mechanism further configured to move the plurality of cargo pod platforms through a continuous loop path comprising a substantially horizontal upper path and a substantially horizontal lower path, the upper path disposed substantially aligned above and parallel to the lower path, wherein the cargo pod platforms can be attached to the at least one cargo carousel mechanism in a spaced-apart configuration along the continuous loop path; and a motor operatively coupled to the at least one cargo carousel mechanism, the motor configured to operate the at least one cargo carousel mechanism wherein the plurality of cargo pod platforms can move along the continuous loop path within the frame.

Broadly stated, in some embodiments, the carousel frame can further comprise a space frame.

Broadly stated, in some embodiments, the carousel frame can further comprise a left frame portion and a right frame portion.

Broadly stated, in some embodiments, each of the left and right frame portions can further comprise one of the at least one cargo carousel mechanism.

Broadly stated, in some embodiments, the at least one cargo carousel mechanism can further comprise: a pair of substantially parallel and horizontal axles, each axle disposed at opposing ends of the frame, each axle further comprising a sheave disposed at opposing ends of the axle, the sheaves on one axle substantially aligned with the sheaves on the other axle; a pair of continuous loop transport mediums disposed between the axles, the continuous loop transport mediums disposed on the sheaves, wherein the pair of continuous loop transport mediums are substantially parallel to each other; and the motor operatively coupled to at least one of the sheaves disposed on one of the axles.

Broadly stated, in some embodiments, each continuous loop transport medium can further comprise a plurality of cargo pod receivers.

Broadly stated, in some embodiments, each of the plurality of cargo pod platforms can comprise: a hanger rod configured to releasably attach to each of the pair of continuous loop transport mediums via the plurality of cargo pod receivers; and a pod platform suspended from the hanger rod by suspension cables, belts or chains.

Broadly stated, in some embodiments, each of the pair of continuous loop transport mediums can further comprise one or more of a group consisting of a cable, a belt and a roller chain.

Broadly stated, in some embodiments, the sheaves can further comprise one or more of a group consisting of cable pulleys, belt pulleys and roller chain sprockets.

Broadly stated, in some embodiments, at least one cargo carousel mechanism can further comprise a pair of roller guides, each roller guide disposed adjacent to one of the continuous loop transport medium, wherein the roller guides form the continuous loop path.

Broadly stated, in some embodiments, each of the plurality of cargo pod platforms can further comprise: a hanger rod configured to releasably attach to the pair of continuous loop transport mediums, the hanger rod further comprising rollers disposed on opposing ends thereof, the rollers configured to move along the roller guides; and a pod platform suspended from the hanger rod by suspension cables, belts or chains.

Broadly stated, in some embodiments, each of the roller guides can further comprise an opening configured for ingress of the rollers thereto and egress of the rollers therefrom.

Broadly stated, in some embodiments, the system can further comprise at least one cargo pod configured to be placed on any of the plurality of cargo pod platforms.

Broadly stated, in some embodiments, the at least one cargo pod can further comprise a second cargo carousel mechanism disposed therein.

Broadly stated, in some embodiments, an improved shipping container is provided, wherein the improvement can comprise a cargo carousel system disposed in the shipping container, the cargo carousel system comprising any or all of the features, elements or characteristics as described above.

DETAILED DESCRIPTION OF EMBODIMENTS

Figure 1:
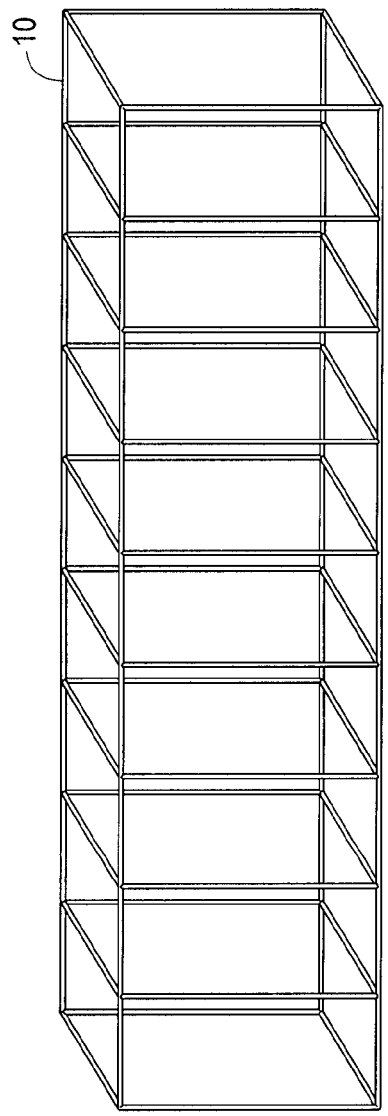
FIG. 1 is a side perspective view depicting a right side framework for a cargo carousel system for shipping containers.
Figure 2:
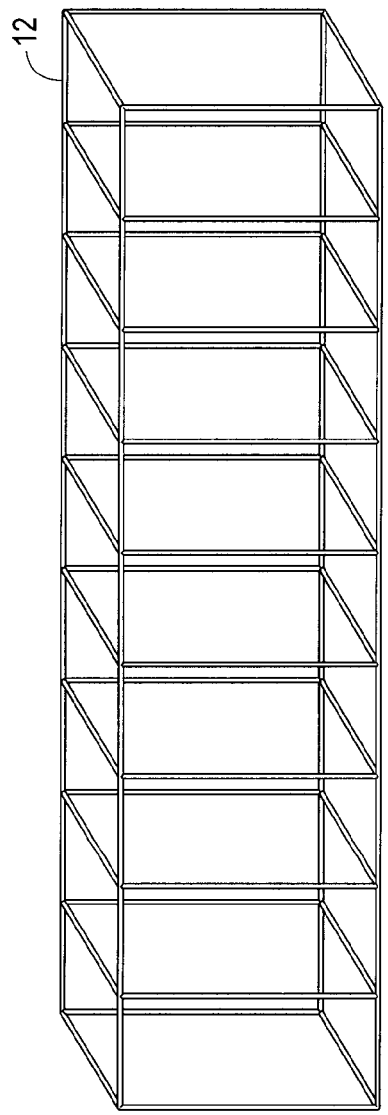
FIG. 2 is a side perspective view depicting a left side framework for a cargo carousel system for shipping containers.
Figure 3:
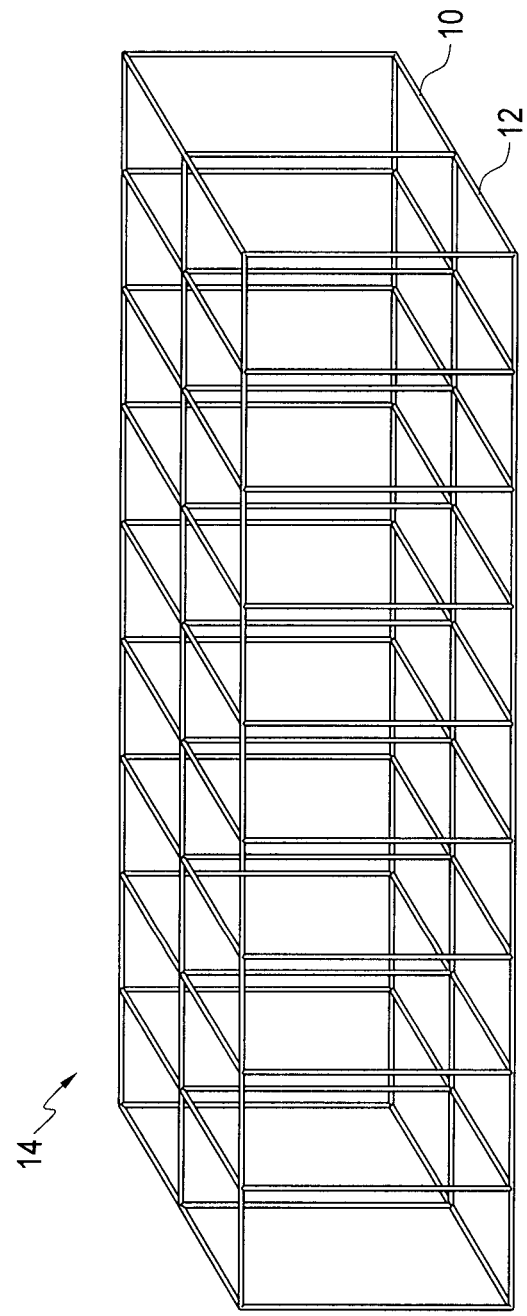
FIG. 3 is a side perspective view depicting the right and left frameworks of FIGS. 1 and 2, respectively, joined together to form a dual framework for a cargo carousel system for shipping containers.

Referring to FIGS. 1, 2 and 3, an embodiment of the frame that can be used with a cargo carousel system is shown. In FIG. 1, right frame portion 10 is shown. In FIG. 2, left frame portion 12 is shown. In FIG. 3, combined frame 14 is shown, comprised of right frame portion 10 joined together with left frame portion 12. In some embodiments, frame portions 10 and 12 can comprise lattice or space frame structures or configurations. In other embodiments, frame portions 10 and 12 can be comprised of structural steel or other suitable material, as well known to those skilled in the art.

Figure 4:
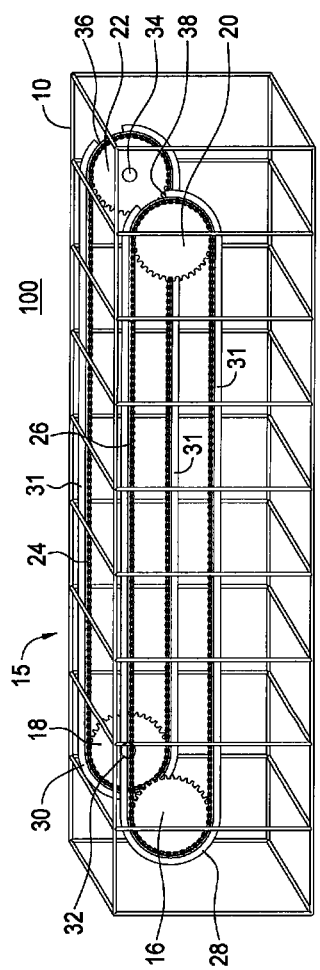
FIG. 4 is a side perspective view depicting the framework of FIG. 1 comprising a cargo carousel mechanism.
Figure 5:
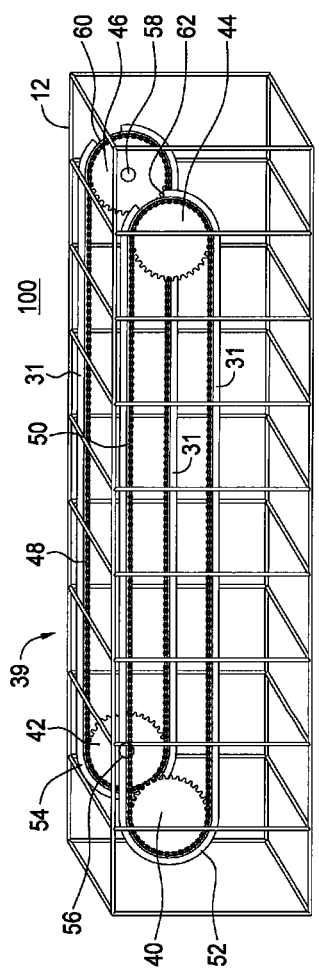
FIG. 5 is a side perspective view depicting the framework of FIG. 2 comprising a cargo carousel mechanism.

Referring to FIGS. 4 and 5, system 100 is shown, with right side frame portion 10 shown with right cargo carousel mechanism 15 disposed therein. Similarly, FIG. 5 illustrates system 100 with left side frame portion 12 having left cargo carousel mechanism 39 disposed therein. In some embodiments, right cargo carousel mechanism 15 can comprise left rear sheave 16 and right rear sheave 18 rotatably connected to frame portion 10 via rear axle 32, and can further comprise left front sheave 20 and right front sheave 22 rotatably connected to frame portion 10 via front axle 34. In some embodiments, continuous loop transport medium 26 can loop around left rear and front sheaves 16 and 20, and continuous loop transport medium 24 can loop around right rear and front sheaves 18 and 22. Similarly, left cargo carousel mechanism 39 can comprise left rear sheave 40 and right rear sheave 42 rotatably connected to frame portion 12 via rear axle 56, and can further comprise left front sheave 44 and right front sheave 46 rotatably connected to frame portion 12 via front axle 58. In some embodiments, continuous loop transport medium 50 can loop around left rear and front sheaves 40 and 44, and continuous loop transport medium 48 can loop around right rear and front sheaves 42 and 46. For the purposes of this application, sheaves 16, 18, 20, 22, 40, 42, 44 and 46 can comprise one or more of a group consisting of cable pulleys, toothed belt pulleys, untoothed belt pulleys and roller chain sprockets, although any functionally equivalent sheave as well known to those skilled in the art can be used. In addition, continuous loop transport mediums 24, 26, 48 and 50 can comprise one or more of a group consisting of a cable, a toothed belt, an untoothed belt and a roller chain, although any functionally equivalent continuous loop transport medium as well known to those skilled in the art can be used. Further, continuous loop transport mediums 24, 26, 48 and 50 can define a continuous loop path when axles 32, 34, 56 and 58 are rotating. In some embodiments, the continuous loop path is disposed in a substantially vertical plane wherein the continuous loop path comprises a substantially horizontal upper path that is substantially align with and parallel to a substantially horizontal lower path.

In some embodiments, right cargo carousel mechanism 15 can comprise a roller guide disposed within the frame, which can comprise curved c-channel portions 28, 30, 36 and 38, and straight c-channel portions 31 extending therebetween. Similarly, left cargo carousel mechanism 39 can comprise a roller guide disposed within the frame, which can comprise curved c-channel portions 52, 54, 60 and 62 and straight c-channel portions 31 extending therebetween.

Figure 6:
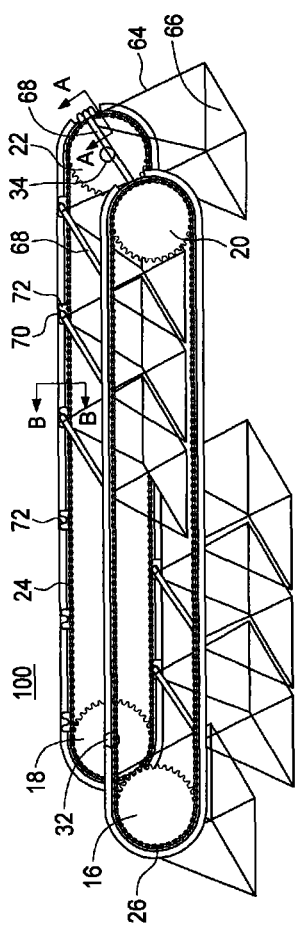
FIG. 6 is a side perspective view depicting the cargo carousel mechanism of FIG. 4 or FIG. 5 with cargo pod platforms attached thereto.

Referring to FIG. 6, one embodiment of cargo carousel mechanism 15 (or 39) is shown. In some embodiments, continuous loop transport mediums 24 and 26 (or 48 and 50) can comprise a plurality of grooved receivers 72 disposed thereon, configured to receive the ends of pod or module hanger rods 68. In some embodiments, each pod or module can comprise of hanger rod 68 and platform 66 suspended therefrom with support means 64. For the purposes of this specification, support means 64 can comprise one or more of a group consisting of chains, cables, ropes and any other means configured for suspending platform 66 as well known by those skilled in the art.

Figure 8:
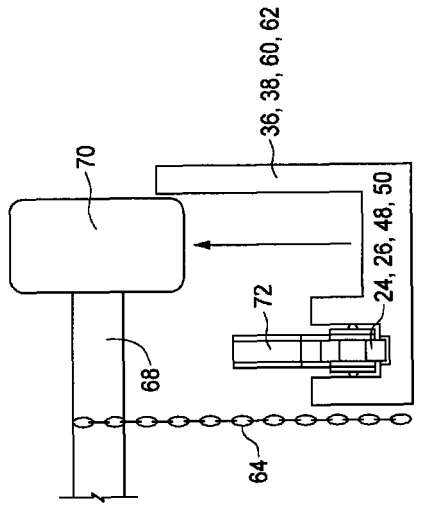
FIG. 8 is an end cross-section view depicting the cargo carousel mechanism of FIG. 6 along section lines A-A.
Figure 7:
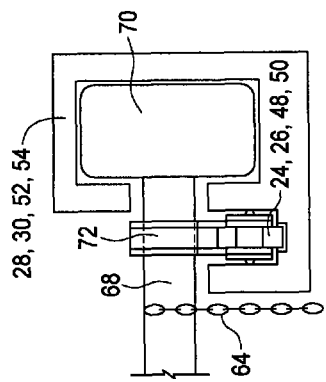
FIG. 7 is an end cross-section view depicting the cargo carousel mechanism of FIG. 6 along section lines B-B.
Figure 9:
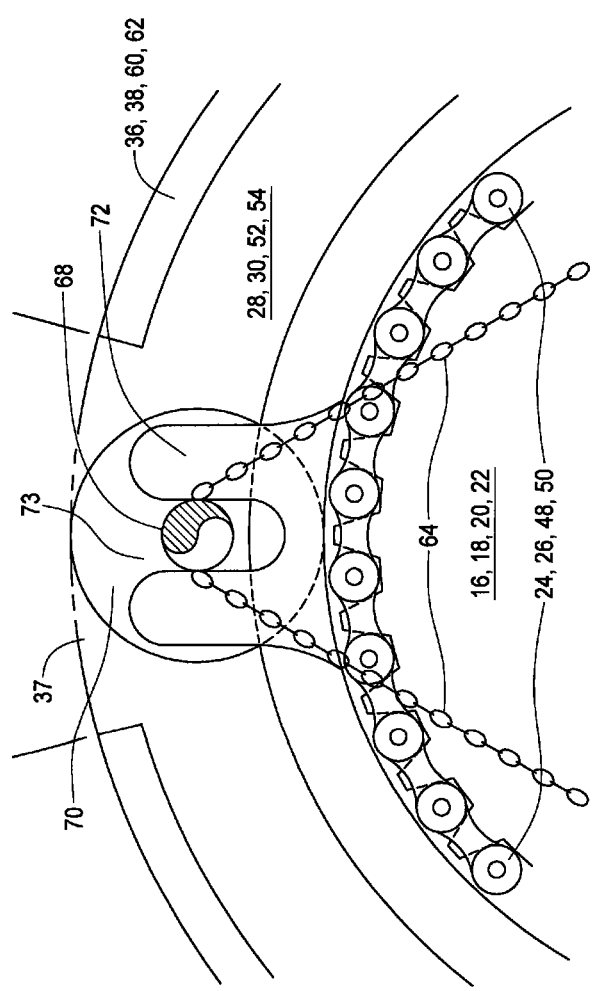
FIG. 9 is a side elevation view depicting a cargo pod suspension axle being received into the cargo carousel mechanism of FIG. 4 or FIG. 5.

Referring to FIGS. 7, 8 and 9, one embodiment of the means for supporting a hanger rod 68 in a roller guide is shown. In some embodiments, hanger rod 68 can comprise roller 70 rotatably disposed thereon, which can be configured to roll within roller guides 28, 30, 52 and 54. Hanger rod 68 can be configured to slide into groove 73 disposed on receivers 72. Rollers 70 and, hence, hanger rods 68 can be placed on or removed from receivers 72 by passing through opening 37 disposed on curved c-channel portions 36, 38, 60 and 62.

Figure 10:
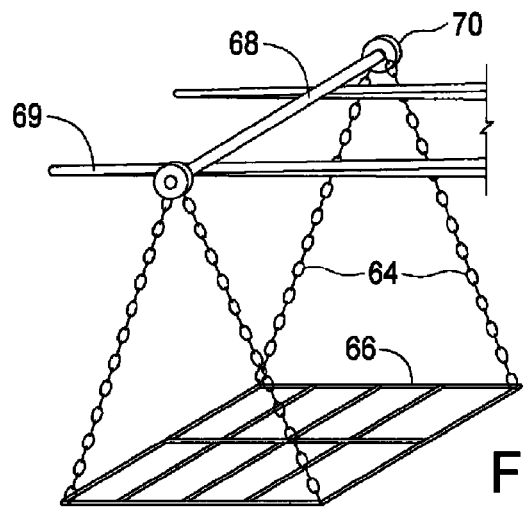
FIG. 10 is a perspective view depicting a cargo pod platform for use with a cargo carousel system for shipping containers.
Figure 11:
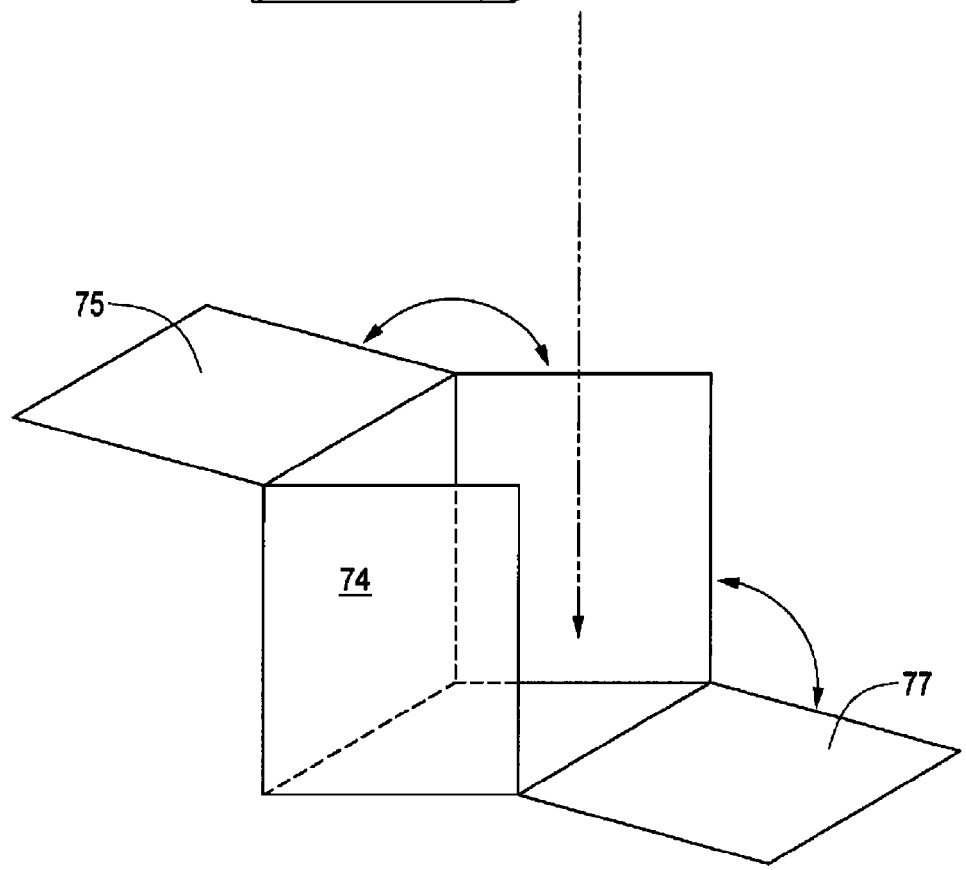
FIG. 11 is a perspective view depicting a cargo pod for use with the cargo pod platform of FIG. 10.

Referring to FIGS. 10 and 11, in some embodiments, a pod platform 66 can be placed in an enclosed cargo pod container 74, comprising hinged top panel 75 and hinged front panel 77 to enclose pod platform 66 when placed therein by a forklift 69, as an example.

Figure 12:
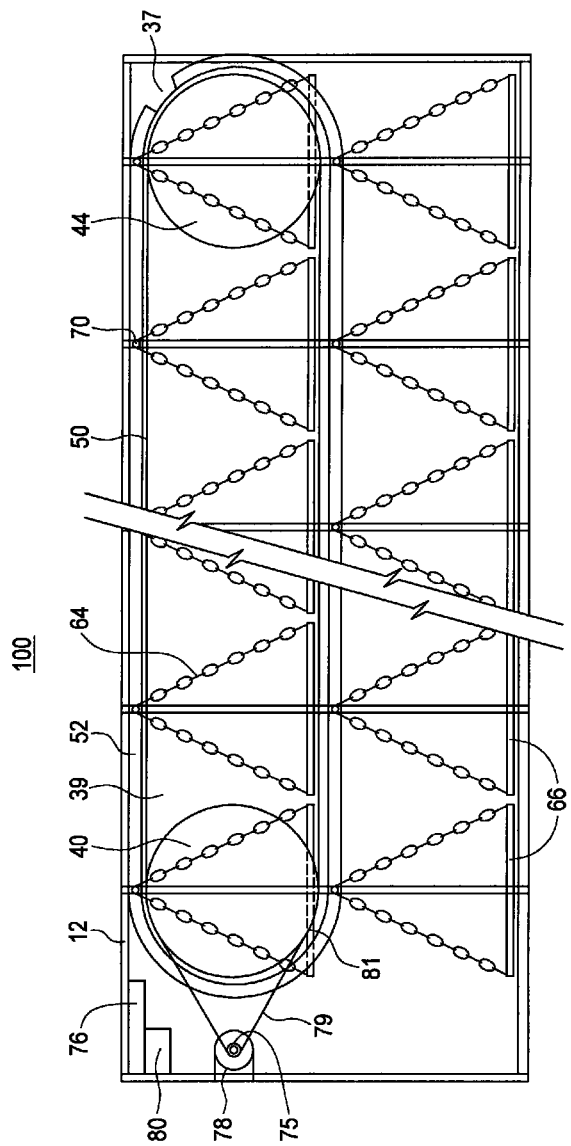
FIG. 12 is a side elevation view depicting the framework of FIG. 4 loaded with a plurality of cargo pod platforms of FIG. 10.
Figure 13:
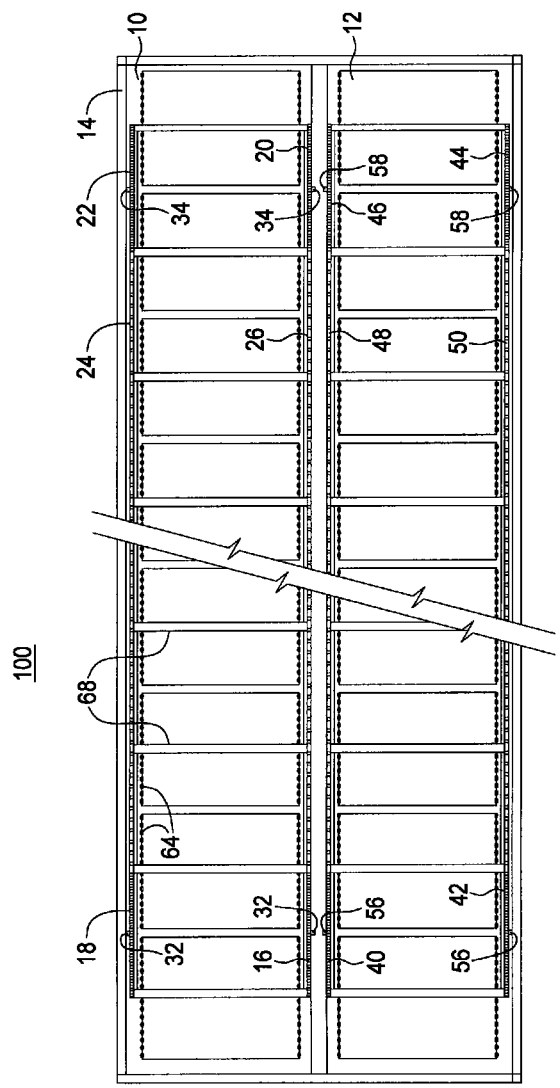
FIG. 13 is a top plan view depicting the framework of FIG. 12.
Figure 14:
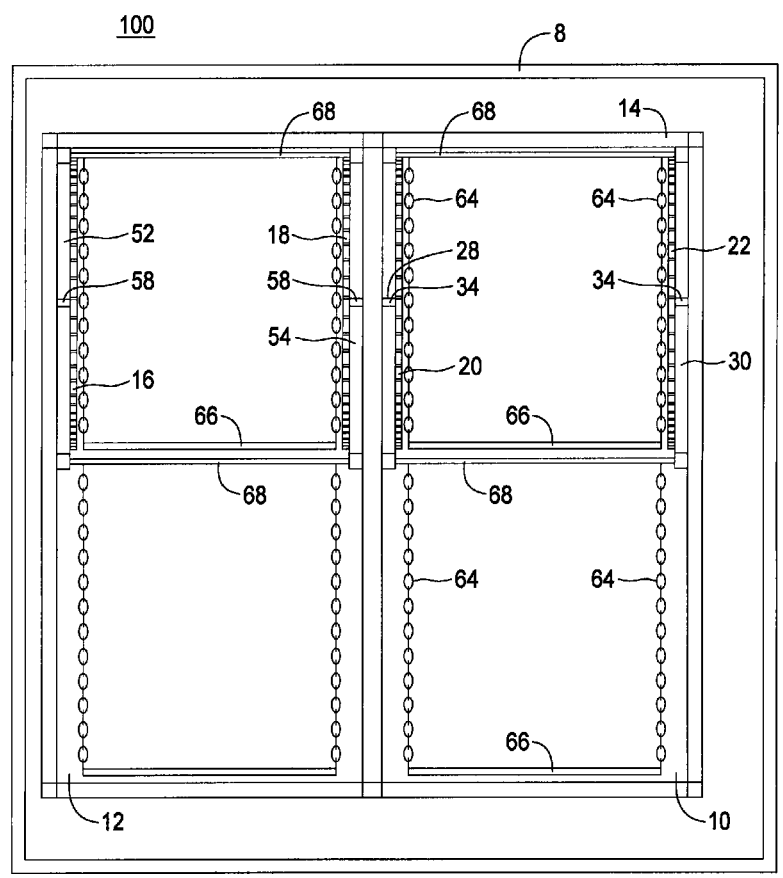
FIG. 14 is an end elevation view depicting the framework of FIG. 12.

Referring to FIG. 12, a side view of cargo carousel mechanism 39 is shown in frame 12 with a plurality of pod platforms 66 supported thereon. In some embodiments, cargo carousel mechanism 39 can be operated to move the plurality of pod platforms 66 around thereabout by motor 78 rotating sheave 40 via belt 79 coupled between pulley disposed on sheave 40 and pulley 75 disposed on motor 78 that, in turn, advances continuous loop transport medium 50. In FIG. 13, a top plan view is provided showing two cargo carousel mechanisms disposed side-by-side in their respective frames 10 and 12, making up combined frame 14. An end elevation view of this embodiment is shown (not to scale) in standard shipping container 8, as illustrated in FIG. 14.

Figure 15:
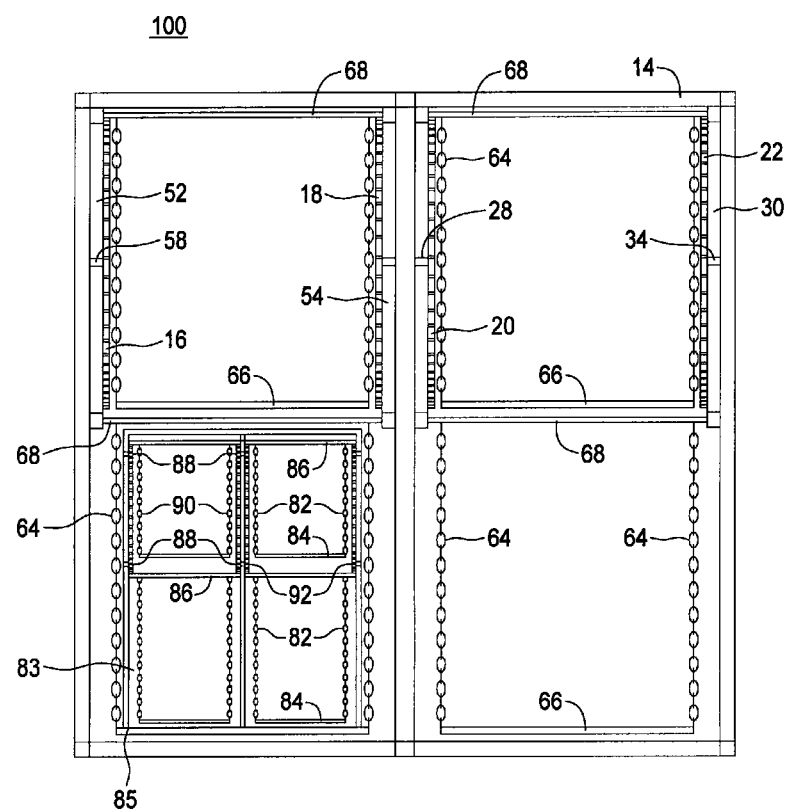
FIG. 15 is an end elevation view depicting the framework of FIG. 14 with a mini-cargo carousel system attached to a cargo pod platform.
Figure 16:
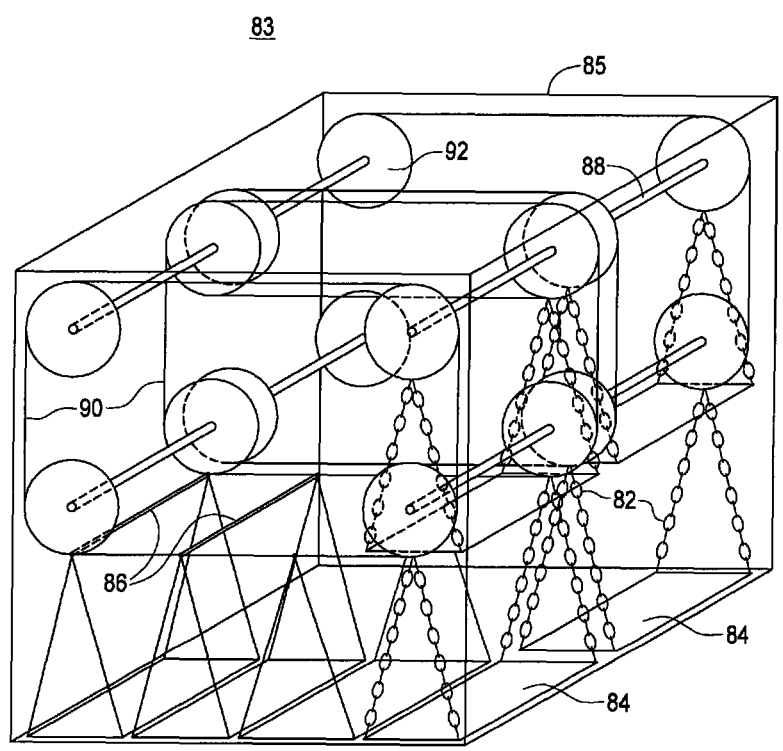
FIG. 16 is perspective view depicting the mini-cargo carousel system of FIG. 15.

Referring to FIGS. 15 and 16, another embodiment of system 100 is shown. In this embodiment, a mini-carousel mechanism 83 can be placed into the system in place of a single pod platform 66. In some embodiments, mini-carousel mechanism 83 can comprise a miniaturized or scaled-down version of system 100 that can be configured to fit within the volume occupied by a single pod platform 66. In some embodiments, mechanism 83 can either comprise a single frame or two frames configured in a side-by-side configuration. In some embodiments, mechanism 83 can comprise frame 85 that can be supported from a hanger rod 68 via support means 64. Within frame 85, a plurality of mini-pod platforms 84 can be suspended from hanger rods 86 via support means 82, similar to support means 64. In some embodiments, hanger rods 86 can be releasably attached to continuous loop transport medium 90 that runs around a plurality of sheaves 90 configured to form a carousel.

In respect of possible uses for system 100, in some embodiments, system 100 can be used, without limitation, in one or more of the following applications:

storage and transportation of clothing storage and transportation of fruits or vegetables storage and transportation of random-sized boxes and containers stacked containers in warehouse or outdoors for deep storage and retrieval of stored goods for use in Unmanned Automated Vehicle systems for loading or unloading of containers using GPS technology for automated "lights-out" warehousing for use in storage and transportation of recyclables or store returns that can be placed in empty positions in the carousel when at a loading dock for storage and transportation of supplies or munitions to/from marine vehicles such as cruise or military ships for storage and retrieval of goods at a retail store location for automated customer pick-up for storage and retrieval of goods at a high-rise residential building or retail mall location with a digital keyboard for automated customer pick-up akin to a large vending machine for use in courier or postal applications for deliveries and pick-ups of mail, parcels, etc. from the same location for use with enclosed and locked modules from different shippers to be shipped in the same container or truck for collaborative transport for small volume shippers to eliminate the use of wooden pallets, thus saving natural resources and weight in the shipping container to ease cross-docking of goods from one truck to another at the same warehouse to eliminate empty backhauls of trucks, thus saving the burning of fossil fuels unnecessarily and decreasing distances traveled to increase utilization of the storage space within the container, thus saving the burning of fossil fuels unnecessarily and decreasing distances traveled for storage and transportation of goods that are easily crushed, by double stacking within the carousels for storage and transportation of goods that are refrigerated by adding refrigeration units to containers for use as extra storage facilities for goods at a retail store location for seasonal or peak periods for use with RFID technology affixed to each module to identify goods within a module anywhere in the world at any time for use as retail display fixtures with goods and merchandise already situated in the container for use with security systems requiring digital keypad control and access to start and stop the carousel to thwart theft of goods from the container, wherein access to any modules beyond the first modules is extremely difficult for storage and transportation of military supplies, arms and munitions to and from war theatres to reduce or eliminate of complete distribution centres by providing stackable, weatherproof, temperature controlled containers in multiple, secure, fenced yards inside or outside urban centres to minimize freight damage of goods as modules cannot be overstacked or shift within containers during transport for use in recycling programs by providing separate modules in a container for different recyclable materials or goods Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

The invention claimed is:

1. A cargo carousel system for use in shipping containers, the system comprising:

a) a carousel frame configured to be disposed in a shipping container;

b) at least one cargo carousel mechanism disposed within the carousel frame, the at least one cargo carousel mechanism configured to releasably receive a plurality of cargo pod platforms, the at least one cargo carousel mechanism further configured to move the plurality of cargo pod platforms through a continuous loop path comprising a substantially horizontal upper path and a substantially horizontal lower path, the upper path disposed substantially aligned above and parallel to the lower path, wherein the cargo pod platforms can be attached to the at least one cargo carousel mechanism in a spaced-apart configuration along the continuous loop path;

c) a motor operatively coupled to the at least one cargo carousel mechanism, the motor configured to operate the at least one cargo carousel mechanism wherein the plurality of cargo pod platforms can move along the continuous loop path within the frame; and d) at least one cargo pod configured to be placed on any of the plurality of cargo pod platforms;

wherein the at least one cargo pod comprises a second cargo carousel mechanism disposed therein.

2. The cargo carousel system as set forth in claim 1, wherein the carousel frame comprises a left frame portion and a right frame portion.

3. The cargo carousel system as set forth in claim 2, wherein each of the left and right frame portions comprises one of the at least one cargo carousel mechanism.

4. The cargo carousel system as set forth in claim 1, wherein the at least one cargo carousel mechanism comprises:

a) a pair of substantially parallel and horizontal axles, each axle disposed at opposing ends of the frame, each axle further comprising a sheave disposed at opposing ends of the axle, the sheaves on one axle substantially aligned with the sheaves on the other axle;

b) a pair of continuous loop transport mediums disposed between the axles, the continuous loop transport mediums disposed on the sheaves, wherein the pair of continuous loop transport mediums are substantially parallel to each other; and c) the motor operatively coupled to at least one of the sheaves disposed on one of the axles.

5. The cargo carousel system as set forth in claim 4, wherein each continuous loop transport medium comprises a plurality of cargo pod receivers.

6. The cargo carousel system as set forth in claim 5, wherein each of the plurality of cargo pod platforms comprise:

a) a hanger rod configured to releasably attach to each of the pair of continuous loop transport mediums via the plurality of cargo pod receivers; and b) a pod platform suspended from the hanger rod by suspension cables, belts or chains.

7. The cargo carousel system as set forth in claim 4, wherein each of the pair of continuous loop transport mediums comprises one or more of a group consisting of a cable, a belt and a roller chain.

8. The cargo carousel system as set forth in claim 7, wherein the sheaves comprise one or more of a group consisting of cable pulleys, belt pulleys and roller chain sprockets.

9. The cargo carousel system as set forth in claim 4, wherein the at least one cargo carousel mechanism further comprises a pair of roller guides, each roller guide disposed adjacent to one of the continuous loop transport medium, wherein the roller guides form the continuous loop path.

10. The cargo carousel system as set forth in claim 9, wherein each of the plurality of cargo pod platforms comprises:

a) a hanger rod configured to releasably attach to the pair of continuous loop transport mediums, the hanger rod further comprising rollers disposed on opposing ends thereof, the rollers configured to move along the roller guides; and b) a pod platform suspended from the hanger rod by suspension cables, belts or chains.

11. The cargo carousel system as set forth in claim 10, wherein each of the roller guides comprises an opening configured for ingress of the rollers thereto and egress of the rollers therefrom.

12. A shipping container comprising a cargo carousel system as defined in claim 1.

* * * * *